Figure 1:
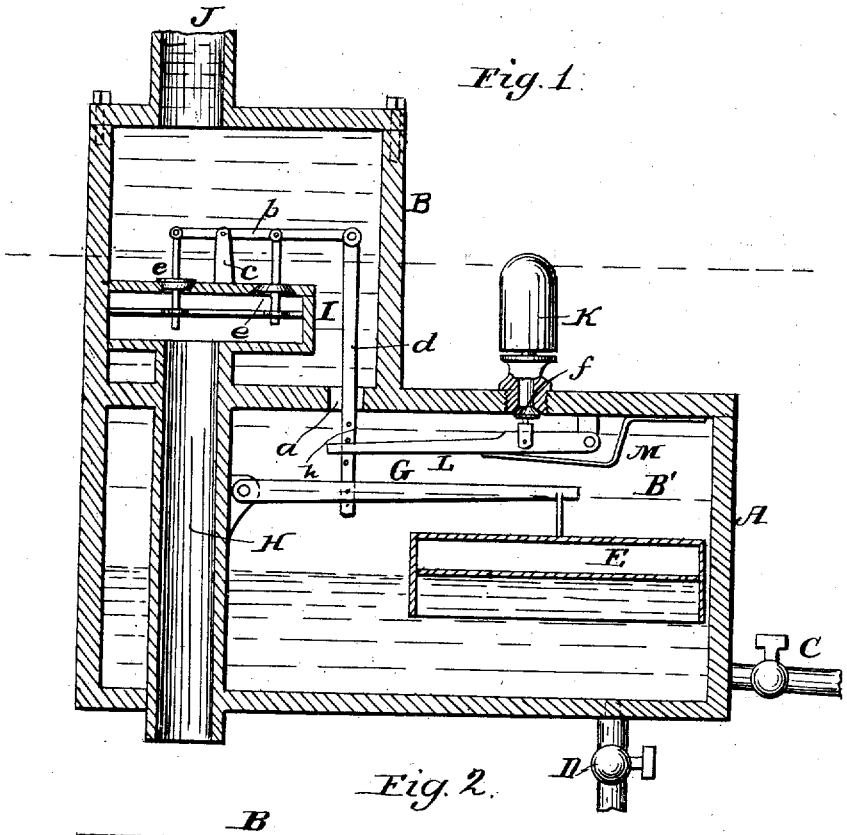

G. P. NUTTING.

Water Supply Regulator.

No. 3,316. Reissued Mar. 2, 1869.

Witnesses:
Chas. Sidler
Wm A Morgan.

Inventor
Geo. P. Nutting,
per Munn & Co
Attorneys.

N. PETERS, Photo-Lithographer, Washington, D. C.

United States Patent Office.

GEORGE P. NUTTING, OF CHICAGO, ILLINOIS.

*Letters Patent No.* 85,121, *dated December* 22, 1868; *reissue No.* 3,316, *dated March* 2, 1869.

IMPROVED WATER-SUPPLY REGULATOR.

The Schedule referred to in these Letters Patent and making part of the same.

*To all whom it may concern:*

Be it known that I, GEORGE P. NUTTING, of Chicago, in the county of Cook, and State of Illinois, have invented a new and improved Water-Supply Regulator; and I do hereby declare that the following is a full, clear, and exact description thereof, which will enable others skilled in the art to make and use the same, reference being had to the accompanying drawings, forming part of this specification.

The object of this invention is to maintain the proper water-supply in boilers, by an automatic arrangement, for admitting steam to the pump for operating it when more water is required, and for shutting off the steam when a sufficient amount has been injected.

Also, to announce to the attendant the state of the water-level, when, for any reason, the pump fails to maintain a sufficiency in the boiler.

It consists in the arrangement of the parts, as will be hereinafter more fully described.

In the drawings—

Figure 2:
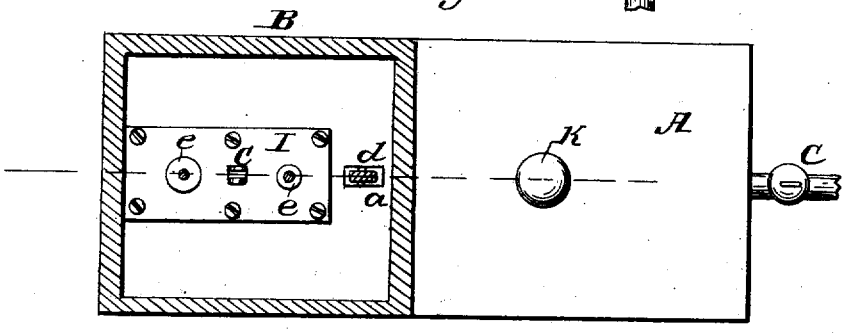

Figure 1 represents a longitudinal sectional elevation of my improved apparatus, and Figure 2 represents a horizontal section on the line *x x* of fig. 1.

Similar letters of reference indicate corresponding parts.

A represents a water and steam-vessel, made of metal, having two compartments, B and B′, the one, B, surmounting the other.

The two are connected by a passage, *a*.

The chamber B′ is connected by a pipe, C, located near the bottom, with the boiler, a little below the contemplated water-line.

J represents a steam-pipe, leading from the steam-dome to the interior of the compartment B, and the steam so admitted also has access to the compartment B′.

Within the chamber B is arranged a steam-chest, I, having two lift-valves, *c c*, suspended from the lever *b* at equal distances on each side of the support *e* of the said lever. One of the said valves opens downward and the other upward, and in practice they are so arranged that their upper areas, whereon the steam acts, are equal, and they are therefore balanced.

The long arm of the lever *b* is connected by a rod, *d*, passing through the opening *a*, to a long lever, G, in the compartment B′, having a fixed fulcrum, and connected at its free end to a float, E, designed to rest on the water, to rise and fall with it.

The float is formed with a recess on its under side, which recess being filled with water, causes the float to respond more quickly to the subsidence of the water, in obedience to the vacuum induced in the recess by the said subsidence.

H represents a steam-pipe, leading from the interior of the steam-chest I to a steam-pump, arranged for supplying water to the boiler.

When the water-level falls in the boiler, it will also fall in the compartment B′, and the float will go down with it, opening the valves *c c*, and admitting steam to the pump, to operate it until the water rises in the boiler, and the compartment B′ sufficiently to close the said valves *c c*.

K represents a steam-whistle, which may be of any preferred construction, attached above the steam-space in the compartment B′, with its valve opening downward.

The stem of the latter is connected to the lever L, having a fixed fulcrum, and arranged at the end of its long arm to encounter a pin, *h*, on the rod *d*, when the latter moves downward.

The said pin *h* may be so adjusted that it will move the lever L and open the valve, to cause the whistle to blow, when the water falls to any predetermined level.

A spring, M, is arranged to restore the whistle-valve when the float rises.

The cock D is used to clear out sediment from the water-chamber, or to serve as a pit-cock in adjusting the apparatus to a change of water-level for it. The cock is wholly or partially opened, to regulate the discharge with reference to the induction-cock C, so that the water will pass from the chamber faster than it enters, whereby the valves *c* may be opened, when required.

I claim as new, and desire to secure by Letters Patent—

1. The arrangement of the vessel A, steam-pipes J H, chest I, valves *c c*, lever *b*, rod *d*, lever G, and float E, substantially as specified.

2. The arrangement of the vessel A, steam-pipes J H, valve-chest I, lever *b*, rod *d*, lever G, float E, adjustable pin *h*, and whistle-valve lever L, substantially as specified.

The above specification of my invention signed by me, this 14th day of January, 1869.

GEO. P. NUTTING.

Witnesses:

H. FRIDRICH,

T. H. ARNOLD.